(12) United States Patent
Stein et al.

(10) Patent No.: US 11,618,464 B2
(45) Date of Patent: Apr. 4, 2023

(54) IDENTIFICATION OF VEHICLE PARAMETERS FOR ADAPTING A DRIVING BEHAVIOR

(71) Applicant: Robert Bosch GmbH, Stuttgart (DE)

(72) Inventors: Fridtjof Stein, Ostfildern (DE); Holger Mielenz, Ostfildern (DE)

(73) Assignee: ROBERT BOSCH GMBH, Stuttgart (DE)

( * ) Notice: Subject to any disclaimer, the term of this patent is extended or adjusted under 35 U.S.C. 154(b) by 177 days.

(21) Appl. No.: 16/910,386

(22) Filed: Jun. 24, 2020

(65) Prior Publication Data
US 2020/0406912 A1 Dec. 31, 2020

(30) Foreign Application Priority Data

Jun. 27, 2019 (DE) .......................... 102019209406.6

(51) Int. Cl.
*B60W 60/00* (2020.01)
*B60W 50/06* (2006.01)
*B60W 50/04* (2006.01)

(52) U.S. Cl.
CPC .......... *B60W 50/06* (2013.01); *B60W 50/045* (2013.01); *B60W 60/001* (2020.02)

(58) Field of Classification Search
None
See application file for complete search history.

(56) References Cited

U.S. PATENT DOCUMENTS

| | | | | |
|---|---|---|---|---|
| 2002/0074856 | A1* | 6/2002 | Suzuki | B60T 13/22 303/166 |
| 2010/0102974 | A1* | 4/2010 | Keast | F15B 19/005 340/626 |
| 2011/0035105 | A1* | 2/2011 | Jolly | B60G 17/0165 |
| 2017/0008525 | A1* | 1/2017 | Ko | B60W 40/076 |
| 2018/0178797 | A1* | 6/2018 | Seaman | B60W 10/30 |
| 2018/0312206 | A1* | 11/2018 | Goodwin | B60L 7/10 |
| 2019/0106115 | A1* | 4/2019 | Huang | B60W 50/023 |
| 2020/0331314 | A1* | 10/2020 | Plantan | B60G 17/005 |
| 2021/0001872 | A1* | 1/2021 | Yang | B60W 50/06 |

(Continued)

FOREIGN PATENT DOCUMENTS

| | | |
|---|---|---|
| DE | 102010026411 A1 | 1/2012 |
| DE | 102013017407 A1 | 4/2015 |

(Continued)

*Primary Examiner* — James M McPherson
(74) *Attorney, Agent, or Firm* — Norton Rose Fulbright US LLP; Gerard Messina

(57) ABSTRACT

A method for adapting a driving behavior of a vehicle or of a vehicle combination based on vehicle parameters, in particular by a control unit. In the method, static vehicle parameters are received, preferably prior to starting the drive, measuring data being collected and received during at least one initiated driving maneuver, the measuring data received during the at least one initiated driving maneuver being evaluated for ascertaining at least one dynamic vehicle parameter, and the static vehicle parameters and/or ascertained dynamic vehicle parameters being transmitted to a vehicle control unit for the vehicle-specific adaptation of a driving behavior. A control unit, a computer program, and a machine-readable memory medium are also described.

11 Claims, 2 Drawing Sheets

(56) References Cited

U.S. PATENT DOCUMENTS

| | | | | |
|---|---|---|---|---|
| 2021/0023904 A1* | 1/2021 | Kasuya | ............... | B60G 17/019 |
| 2021/0024097 A1* | 1/2021 | Jardine | ............ | B60W 60/0051 |
| 2021/0146803 A1* | 5/2021 | Wu | ...................... | B60N 2/0232 |
| 2022/0097473 A1* | 3/2022 | Kasuya | ............. | B60G 17/0165 |

FOREIGN PATENT DOCUMENTS

| | | |
|---|---|---|
| DE | 102014018717 A1 | 6/2016 |
| DE | 102017207075 A1 | 10/2018 |

\* cited by examiner

IDENTIFICATION OF VEHICLE PARAMETERS FOR ADAPTING A DRIVING BEHAVIOR

CROSS REFERENCE

The present application claims the benefit under 35 U.S.C. § 119 of German Patent Application No. DE 102019209406.6 filed on Jun. 27, 2019, which is expressly incorporated herein by reference in its entirety.

FIELD

The present invention relates to a method for adapting a driving behavior of a vehicle or of a vehicle combination based on vehicle parameters. The present invention furthermore relates to a control unit, to a computer program, and to a machine-readable memory medium.

BACKGROUND INFORMATION

A trend toward an increasing development of automated driving functions may be observed in the vehicle field. In particular, trucks are to autonomously assume a plurality of logistic tasks in the future.

Trucks are usable in a versatile manner and have a high variability. For example, trucks may be operated as a tractor with or without a semitrailer, with a flatbed body or a box body, with or without a trailer. In addition, the cargo, the loading degree and a load distribution may deviate from one another.

Vehicle drivers of such trucks are able to estimate the varying driving behavior based on experience and "feel" and accordingly implement it in the control of the truck.

Vehicles operated in an automated manner are controlled in their longitudinal guidance and transverse guidance by a vehicle control unit. For this purpose, the vehicle control unit accesses measuring data of vehicle-side surroundings sensors and evaluates them. To ascertain variable vehicle parameters, which are relevant, for example, for vehicle dynamics of the vehicle, the vehicle would have to carry out a comprehensive parameter identification with the aid of defined test maneuvers. Such test maneuvers, however, are not permitted on public roads and have to be carried out on closed test tracks.

SUMMARY

An object of the present invention is to provide a method for ascertaining vehicle parameters during the day-to-day operation of a vehicle, as well as an adaptation of the vehicle control based on the ascertained vehicle parameters.

This object may be achieved in accordance with example embodiments of the present invention. Advantageous embodiments of the present invention are described herein.

According to one aspect of the present invention, an example method for adapting a driving behavior of a vehicle or of a vehicle combination based on vehicle parameters, in particular, by a control unit, is provided.

In one step, static vehicle parameters are received, the static parameters being received prior to starting a drive. As an alternative or in addition, measuring data may be received from a surroundings sensor system and/or a GNSS sensor and evaluated prior to starting the drive.

During at least one initiated driving maneuver, measuring data are ascertained by sensors and received by the control unit. Such driving maneuvers may preferably be initiated by a vehicle-side planning unit or a trajectory planning. The driving maneuvers are driving maneuvers carried out on public roads, which are carried out under defined conditions, such as at a constant speed. In particular, the driving maneuvers may be carried out within the scope of a regular trip. The measuring data may represent feedback or reactions to the conducted driving maneuvers.

The measuring data ascertained during the at least one initiated driving maneuver are evaluated for ascertaining at least one dynamic vehicle parameter. Depending on the vehicle parameter, an estimation may be carried out, based on the measuring data, when the corresponding vehicle parameter is not precisely calculatable.

Thereafter, the static vehicle parameters and/or the ascertained dynamic vehicle parameters are transmitted to a vehicle control unit for the vehicle-specific adaptation of a driving behavior. In addition to a driving behavior adapted by the vehicle parameters, it is also possible to carry out an adaptation of the trajectory planning by the ascertained vehicle parameters. For example, the negotiation of serpentines and larger uphill grades may be avoided or limited by such a trajectory planning in the case of a high payload and the reduced driving dynamics.

According to another aspect of the present invention, an example control unit is provided, the control unit being configured to carry out the method. For example, the control unit may be a vehicle-side control unit or a vehicle-external control unit. For example, the control unit may be connectable to a vehicle control unit for carrying out automated driving functions or be integrated into such a vehicle control unit. An externally designed control unit may, for example, be a vehicle-external server unit, which is based on a cloud technology.

According to one aspect of the present invention, moreover, an example computer program is provided, encompassing commands which, during the execution of the computer program by a computer or a control unit, prompt the computer to carry out the method according to the present invention. According to another aspect of the present invention, a machine-readable memory medium is provided, on which the computer program according to the present invention is stored.

The vehicle may be operable in an assisted, semi-automated, highly automated and/or fully automated or driverless manner according to the BASt standard. In particular, the vehicle may be implemented as a passenger car, a bus, a commercial vehicle, a truck and the like. The vehicle may be configured as a vehicle combination, which includes a trailer or a semitrailer. The vehicle may also be implemented as a tractor without a trailer or a semitrailer.

The at least one sensor of the surroundings sensor system may preferably be a LIDAR sensor, a radar sensor, an ultrasonic sensor, a camera sensor, a GNSS sensor and the like, for example.

In response to the at least one conducted driving maneuver, measuring data from acceleration sensors, path sensors of the suspension, yaw, pitch, roll rate sensors, king pin-articulation angle sensors and the like, may be collected and evaluated. The measuring data from sensors of the vehicle and/or a trailer or a semitrailer may be received by the control unit in the process and be evaluated.

The vehicle parameters are preferably configured as influencing factors, which influence the computer program and/or the vehicle control unit and/or sub-programs of the vehicle control unit. In this way, a "feel" for the vehicle dynamics may be communicated to the vehicle control unit, and, in particular, the safety during the automated driving operation may be enhanced.

By introducing driving maneuvers for the parameter identification into the regular operation of the vehicle, it is possible, for example, to particularly safely operate vehicles having a high variability in the payload and the load distribution. The high variability may be influenced, for example, by a varying number of passengers and the varying distribution of the passengers. Moreover, in the case of trucks or trailers, a solid or liquid cargo may permanently or intermittently be unevenly distributed. In particular, liquid cargo may develop a sloshing behavior, which may be taken into consideration and compensated for by the vehicle control unit based on the ascertained vehicle parameters.

The vehicle control unit may generate control commands for actuating lateral and longitudinal actuating units, so that a steering, an acceleration and a braking are made possible. The vehicle parameters may influence the manner of the actuation of the actuating unit. In this way, it is possible, for example, to estimate and take into consideration a stopping distance, a maximum curve speed, an acceleration behavior and the like, for the safe automated driving operation. Furthermore, a speed of a steering angle and a degree of deceleration during the brake application may be set by the ascertained vehicle parameters.

The static vehicle parameters, such as the vehicle type, the trailer type, the number of axles, the sensors, may preferably be received by the control unit at a standstill of the vehicle, or during the coupling of a trailer or during an activation of the vehicle.

With the aid of the example method, vehicle parameters may be determined in an isolated manner or individually as characteristic variables of models based on individual driving maneuvers. The identification of the vehicle parameters may preferably be identified by formed sub-models of one of the overall models in an isolated manner and in a certain order.

According to one exemplary embodiment of the present invention, unknown dynamic vehicle parameters are predefined as worst-case vehicle parameters when starting the drive. In this way, it is possible to initialize unknown vehicle parameters using worst-case values. While driving, the worst-case values may be increasingly updated or replaced with measured or estimated vehicle parameters. If the driving safety and traffic, for example due to a clear roadway, allow, identification driving maneuvers may be input into the regular driving operation to ascertain the vehicle parameters.

In addition to the static vehicle parameters, which are not regularly updated or ascertained, such as properties of the drive train, a plurality of dynamic vehicle parameters is present for the vehicle control unit to allow an automated driving state to be safely and reliably maintained. For example, the following vehicle parameters may be relevant during a change of a semitrailer:

- is the tractor or the semitrailer loaded
- movability of the cargo, state of aggregation of the cargo
- degree of loading of the semitrailer and/or of the tractor
- distribution of the cargo
- tire equipment
- dual tires
- number of axles
- number of lift axles
- pusher axles as steering axles
- suspension and level regulation
- stiffness of tractor and of the trailer or semitrailer
- type of the trailer or semitrailer
- dead weight of the trailer or semitrailer The enumeration of the vehicle parameters serves only illustration purposes and is not exhaustive.

According to one further exemplary embodiment of the present invention, a brake test is initiated as the driving maneuver for ascertaining safety-relevant dynamic vehicle parameters when starting the drive. Such a brake test is, in particular, required for trucks and may be carried out while driving slowly. During such a brake test, a mass, a stopping distance and the sloshing behavior may be estimated by the control unit. In this way, multiple safety-relevant vehicle parameters may be ascertained based on a driving maneuver and be taken into consideration by the vehicle control unit.

The dynamic vehicle parameters may be carried out at regular intervals or continuously since the vehicle parameters along a trajectory may change. For example, a tractor without trailer may depart a depot. A subsequent coupling of an empty semitrailer influences the driving behavior of the tractor in a relevant manner. After a further route section, the semitrailer is filled completely or partially with cargo, for example a liquid. Depending on the design of the semitrailer, anti-slosh baffles or no anti-slosh baffles may be provided in the transport container of the semitrailer, by which a different sloshing behavior arises.

According to one further exemplary embodiment of the present invention, at least one identification driving maneuver is initiated within the scope of the regular driving operation for ascertaining other dynamic vehicle parameters. Such driving maneuvers may already be taken into consideration during the planning of the trajectory or be initiated during the driving operation. For example, a driving maneuver may be initiated when traffic allows and no safety risks are present. As a result of the at least one driving maneuver, measuring data may be collected under established and comparable conditions, and vehicle parameters may be calculated or estimated based on the measuring data. An exemplary driving maneuver may include the negotiation of a traffic circle at a defined constant speed.

According to one further specific embodiment of the present invention, the vehicle parameters to be ascertained are managed and initialized in a vehicle-specific manner prior to starting the drive or docking. For example, the management may be carried out by a planning module in the control unit or a vehicle control unit. The planning module may preferably determine the vehicle parameters which have to be identified for the driving operation. In this way, a list of necessary vehicle parameters may be created, which are initialized prior to starting the drive or during a docking, as well as ascertained during the further driving course. The planning module may manage a maneuver catalog in the process, and initiate the corresponding driving maneuvers for ascertaining static and dynamic vehicle parameters.

According to one advantageous embodiment of the present invention, the planning module may integrate the driving maneuvers necessary for ascertaining the vehicle parameters into a regular trajectory or route of the vehicle. The integration of the driving maneuvers may preferably take place seamlessly. In this way, the driving maneuvers may be carried out during regular driving, and the necessary calculations for ascertaining the vehicle parameters may be carried out. The ascertained vehicle parameters may be intermittently or permanently stored and forwarded to the vehicle control unit for acting on the actuators of the vehicle.

In particular, it may thus be established in advance which vehicle parameters are determined, and in which order. For example, it may be known prior to starting the drive that no trailer or semitrailer is coupled, so that a test order that deviates compared to a vehicle combination, or a changed parameter list, is checked.

According to a further specific embodiment of the present invention, a first group of dynamic vehicle parameters is ascertained and/or updated once when starting the drive, and a second group of dynamic vehicle parameters is ascertained and/or updated continuously while driving. Each group may be made up of one or multiple vehicle parameter(s).

The first group of vehicle parameters may, for example, contain static vehicle parameters. These vehicle parameters may include, for example, a curb weight of the vehicle, dimensions of the vehicle, parameters of the trailer or semitrailer and the like.

The second group of vehicle parameters may preferably include dynamic vehicle parameters, which may change regularly. For this purpose, a continuous monitoring of the vehicle parameters from the second group is necessary. The second group may encompass, for example, a load distribution, a sloshing behavior, a pivot point, a center of gravity and the like as vehicle parameters.

According to one further specific embodiment, control commands for initiating a safety stop are transmitted to the vehicle control unit during a safety-relevant change of at least one vehicle parameter of the second group. As a result of the continuous monitoring of the vehicle parameters of the second group, discrepancies or sudden deviations may be identified and used to initiate measures. For example, a shifting of cargo over a duration may be measurable thereby. The initiation of a safety stop, for example, may be a possible measure. As an alternative or in addition, the vehicle may be transferred into a safe state, the vehicle being prompted by the control unit to approach a shoulder, a parking lot or a parking area.

According to one further exemplary embodiment of the present invention, a service unit is requested via a communication link in the case of a safety-relevant change of at least one vehicle parameter. In this way, a further measure may be provided in the event of an ascertained discrepancy during the continuous monitoring of the vehicle parameters. The service unit may be a vehicle-external service unit, which is configured as a so-called flying doctor, for example.

Preferred exemplary embodiments of the present invention are described in greater detail hereafter based on highly simplified schematic representations shown in the figures.

DETAILED DESCRIPTION OF EXAMPLE EMBODIMENTS

Figure 1:
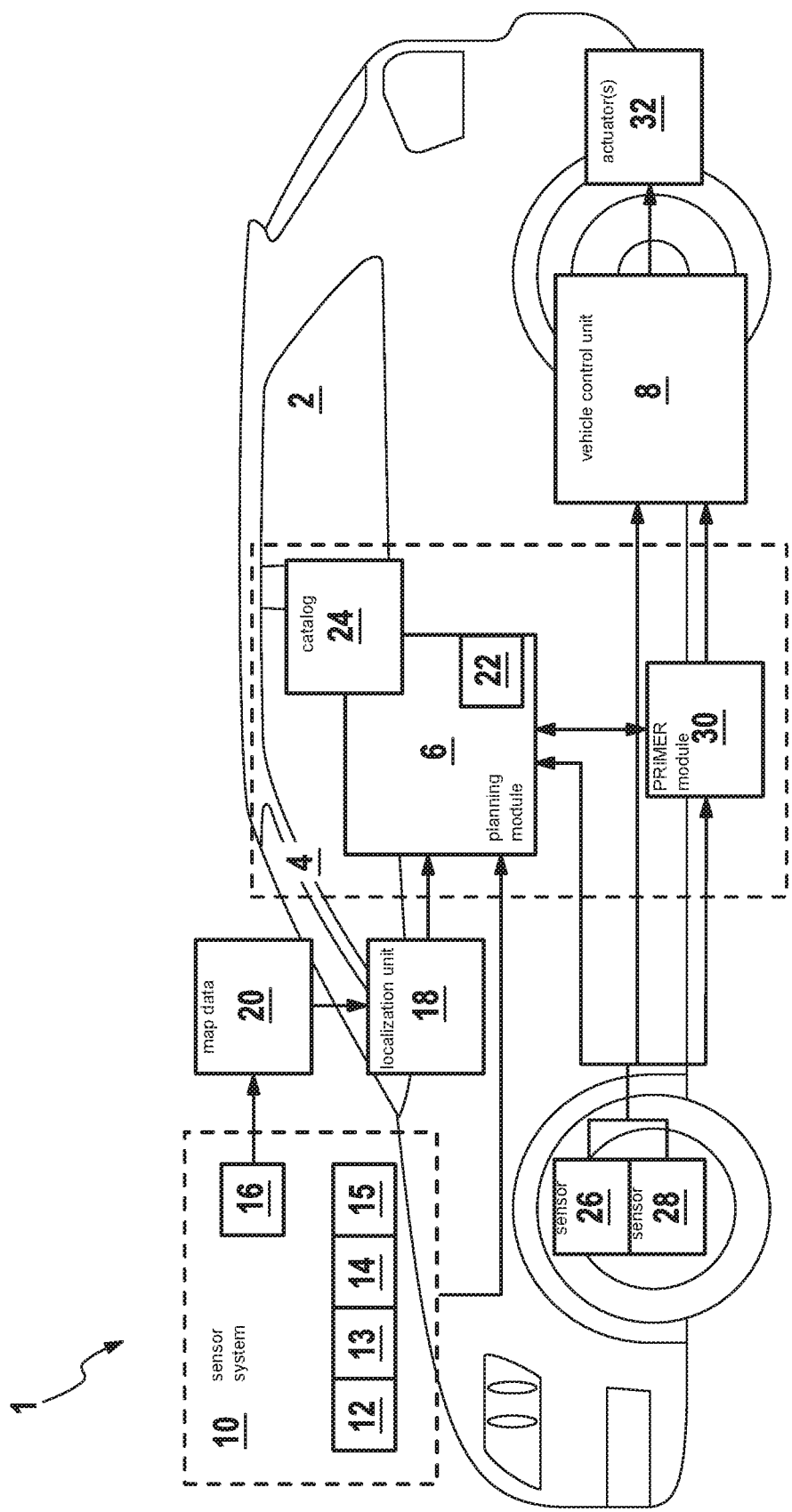
FIG. 1 shows a schematic system for illustrating the method according to one exemplary embodiment of the present invention.

FIG. 1 shows a schematic system for illustrating method 1 according to one exemplary embodiment of the present invention. In particular, a vehicle 2 including a control unit 4 and a vehicle control unit 8 are shown. A planning module 6 is also integrated into control unit 4. Vehicle 2 is implemented as a passenger car here, but may also be a commercial vehicle, a bus, a delivery van, a truck and the like.

Control unit 4, planning module 6 and vehicle regulation unit or vehicle control unit 8 may have a hardware-based and/or software-based design. In particular, control unit 4, planning module 6 and vehicle control unit 8 may be configured as one component or as multiple mutually connectable components, it being possible for the respective tasks of control unit 4, of planning module 6 and of vehicle control unit 8 to be separate from one another or shared among one another.

Control unit 4 is connectable to a surroundings sensor system 10 of vehicle 2 to receive and evaluate the collected measuring data of surroundings sensor system 10.

Surroundings sensor system 10, by way of example, includes a camera sensor 12, a LIDAR sensor 13, a radar sensor 14, an ultrasonic sensor 15, and a GPS sensor 16.

A localization unit 18 may carry out a localization of vehicle 2 based on map data 20 and the received measuring data of GPS sensor 16. The corresponding localization data may be transmitted in parallel to the measuring data of surroundings sensor system 10 to control unit 4, preferably to planning module 6. The measuring data of surroundings sensor system 10 may also be merged with one another and thereafter transmitted to control unit 4.

Static vehicle parameters may be received by control unit 4, or may already be stored in a machine-readable memory medium 22. The static vehicle parameters may preferably be received prior to starting the drive. Ascertained or estimated vehicle parameters may also be stored in machine-readable memory medium 22.

Control unit 4 includes a so-called PRIMER catalog 24, which includes a list of driving maneuvers. Depending on vehicle 2 and vehicle combination 3, this catalog 24 may have a different order and a different type of driving maneuvers. This catalog 24 is taken into consideration during the trajectory planning of planning module 6. In this way, driving maneuvers may be introduced into the regular driving operation of vehicle 2, 3. Acceleration tests, brake tests, slow curve negotiations, drastic steers, frequency responses during the steering motion as well as during the deceleration of vehicle 2, 3 may be used as possible driving maneuvers.

Measuring data are ascertained by further sensors or state sensors 26, 28 during at least one initiated driving maneuver and transmitted to control unit 4. State sensors 26, 28 may be, for example, acceleration sensors 26, path sensors of suspension 28, yaw, pitch, roll rate sensors, king pin-articulation angle sensors, tire pressure sensors and the like.

To ascertain the vehicle parameters based on the measuring data of state sensors 26, 28, control unit 4 may include a so-called PRIMER module 30. PRIMER module 30 is, for example, a computing module for vehicle parameters and may calculate or estimate the vehicle parameters independently or prompted by planning module 6. The calculated vehicle parameters may be stored in machine-readable memory medium 22.

The static vehicle parameters may also be ascertained or received by PRIMER module 30 of control unit 4 and be stored in machine-readable memory medium 22.

The static and/or dynamic vehicle parameters are transmitted to vehicle control unit 8 for the vehicle-specific adaptation of a driving behavior of vehicle 2, 3.

Based on the received vehicle parameters, vehicle control unit 8 may generate an adapted activation of actuators 32 for transverse control and longitudinal control of vehicle 2, 3.

Figure 2:
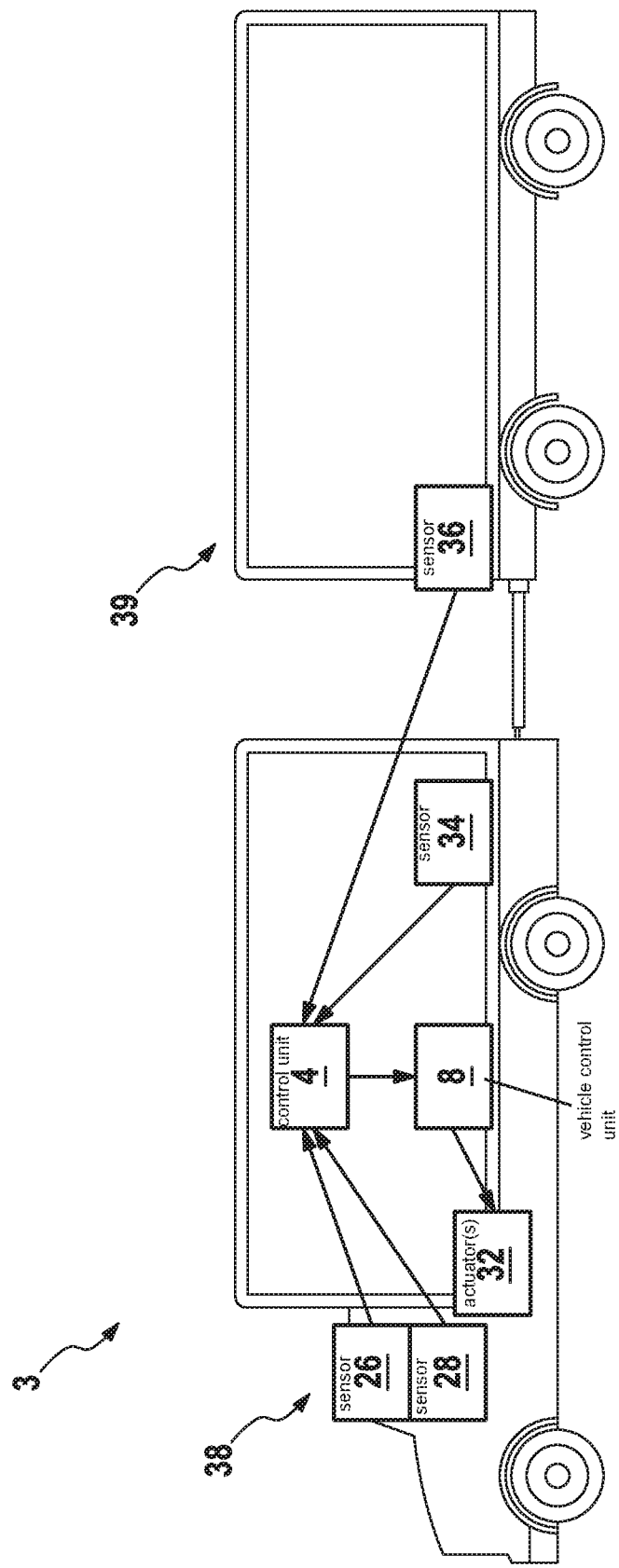
FIG. 2 shows a schematic representation of possible state sensors as feedback from driving maneuvers, in accordance with an example embodiment of the present invention.

FIG. 2 shows a schematic representation of possible state sensors 26, 28, 34, 36 for collecting measuring data as feedback from defined driving maneuvers. According to the illustrated exemplary embodiment, the vehicle is implemented as a vehicle combination 3. Vehicle combination 3 is made up of a tractor 38 and a trailer 39. As an alternative, tractor 38 may be configured as an 18-wheeler, and trailer 39 may be configured as a semitrailer. In addition, vehicle combination 3 may include multiple trailers 39.

In response to defined driving maneuvers for ascertaining vehicle parameters, measuring data of state sensors 26, 28, 34 of tractor 38 and measuring data of state sensors 36 of trailer 39 are received and evaluated by control unit 4.

Preferably, multiple state sensors may be situated in tractor 38 and trailer 39. For example, in addition to acceleration sensors 26 and the path sensors of suspension 28 of tractor 38, further sensors 34 may be introduced in the area of the tractor-side cargo area or the box body. These state sensors 34 may, for example, be tire pressure sensors of the rear wheels.

Trailer 39 may include acceleration sensors or tilt and inclination sensors, for example, as state sensors 36. In addition, state sensors may include sensors for ascertaining an inclination angle or rotation angle with respect to tractor 38. In addition, state sensors may also be positioned in multiple positions of trailer 39 and connectable to control unit 4.

What is claimed is:

1. A method of a vehicle that includes static structures and at least one variable structure whose state is variable, the at least one variable structure being (1) an amount of loaded cargo with the state being variable between different values of the amount, (2) a distribution of the cargo over a loadable area of the vehicle with the state being variable between different values of the distribution, and/or (3) a cargo-holding structure (i) with the state being variable between being in a form of a flatbed and being in a form of a box body and/or (ii) with the state being variable between having a trailer or semi-trailer attached thereto and being in a state in which no trailer and no semi-trailer is attached thereto, the method comprising:
   receiving, by a control unit and prior to a start of a drive, static vehicle parameters, which are of the static structures of the vehicle;
   receiving, by the control unit and during performance by the vehicle of at least one driving maneuver of the drive, measuring data, wherein during the at least one driving maneuver, a driving behavior of the vehicle is controlled by the control unit according to the static vehicle parameters;
   evaluating, by the control unit, the measuring data ascertained during the performance of the at least one driving maneuver;
   based on the evaluation, ascertaining, by the control unit, which of the variable states is a present state of the at least one of a variable structure; and
   modifying, by the control unit, the driving behavior of the vehicle based on the ascertained present state.

2. The method as recited in claim 1, wherein, prior to the ascertainment of the present state, the drive is controlled by the control unit according to a predefined assumed state of the at least one of the variable structure.

3. The method as recited in claim 1, further comprising controlling, by the control unit, the vehicle to perform an automatic braking after starting the drive in order to obtain at least a portion of the measuring data when the braking is not otherwise required.

4. The method as recited in claim 1, further comprising, while the vehicle is being driven to a target location and prior to the ascertainment of the present state, controlling the vehicle to perform, as at least part of the at least one driving maneuver, at least one identification driving maneuver that propels or inhibits a propulsion of the vehicle along a road and that is not used for reaching the target location in order to obtain at least a portion of the measuring data during the at least one identification driving maneuver.

5. The method as recited in claim 1, wherein the receiving and evaluating of the measuring data and the ascertaining of the present state is performed continually during the drive, thereby continually updating the ascertained present state.

6. The method as recited in claim 5, further comprising, in response to detection, as a result of the receiving and evaluating of the measuring data and the ascertaining of the present state being continually performed, of a predefined change to the variable state, controlling the vehicle to bring the vehicle to a stop.

7. The method as recited in claim 1, further comprising, in response to detection, as a result of the receiving and evaluating of the measuring data and the ascertaining of the present state being continually performed, of a predefined change to the variable state, transmitting over a communication link a request for a service unit.

8. A control unit comprising a processor for control a vehicle that includes static structures and at least one variable structure whose state is variable, the at least one variable structure being (1) an amount of loaded cargo with the state being variable between different values of the amount, (2) a distribution of the cargo over a loadable area of the vehicle with the state being variable between different values of the distribution, and/or (3) a cargo-holding structure (i) with the state being variable between being in a form of a flatbed and being in a form of a box body and/or (ii) with the state being variable between having a trailer or semi-trailer attached thereto and being in a state in which no trailer and no semi-trailer is attached thereto, wherein, for the control, the processor is configured to:
   receive, prior to a start of a drive, static vehicle parameters, which are of the static structures of the vehicle;
   receive measuring data during performance by the vehicle of at least one driving maneuver of the drive during which a driving behavior of the vehicle is controlled by the control unit according to the static vehicle parameters;
   evaluate the measuring data ascertained during the performance of the at least one driving maneuver;
   based on the evaluation, ascertain which of the variable states is a present state of the at least one variable structure; and
   modify the driving behavior of the vehicle based on the ascertained present state.

9. A non-transitory machine-readable memory medium on which is stored a computer program that is executable by a control unit and that, when executed by the control unit, causes the control unit to perform a method for a vehicle that includes static structures and at least one variable structure whose state is variable, the at least one variable structure being (1) an amount of loaded cargo with the state being variable between different values of the amount, (2) a distribution of the cargo over a loadable area of the vehicle with the state being variable between different values of the distribution, and/or (3) a cargo-holding structure (i) with the state being variable between being in a form of a flatbed and being in a form of a box body and/or (ii) with the state being variable between having a trailer or semi-trailer attached thereto and being in a state in which no trailer and no semi-trailer is attached thereto, the method comprising:
   receiving, prior to a start of a drive, static vehicle parameters, which are of the static structures of the vehicle;
   receiving measuring data during performance by the vehicle of at least one driving maneuver of the drive during which a driving behavior of the vehicle is controlled by the control unit according to the static vehicle parameters;
evaluating the measuring data ascertained during the performance of the at least one driving maneuver;
based on the evaluation, ascertaining which of the variable states is a present state of the at least one variable structure; and
modifying the driving behavior of the vehicle based on the ascertained present state.

10. The method as recited in claim 1, further comprising, prior to the receiving of the measuring data:
receiving, by the control unit, input of a target location;
planning, by the control unit, the drive to include a route from a current location to the target location; and
modifying, by the control unit, the drive to include the at least one driving maneuver in order to obtain the measuring data, wherein the at least one driving maneuver propels or inhibits a propulsion of the vehicle along a road.

11. The method as recited in claim 1, further comprising, prior to the receiving of the measuring data:
receiving, by the control unit, input of a target location; and
based on (a) an identification of the variable state whose present status is to be ascertained and (b) the received target location, planning, by the control unit, the drive to include a route from a current location to the target location and to include performance of the at least one driving maneuver in order to obtain the measuring data, wherein the at least one driving maneuver propels or inhibits a propulsion of the vehicle along a road.

* * * * *